UNITED STATES PATENT OFFICE.

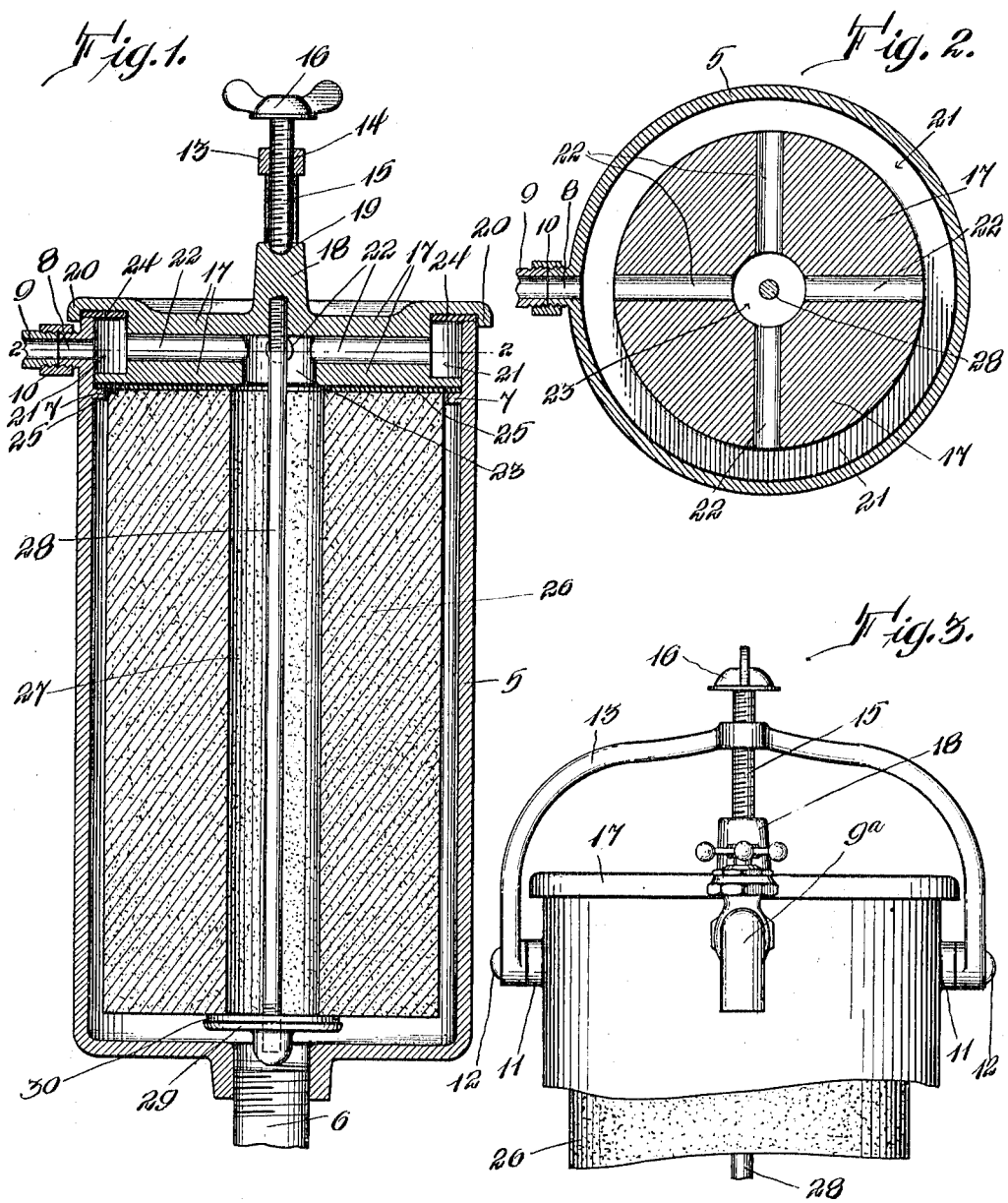

SIEGFRIED HELD, OF CHICAGO, ILLINOIS, ASSIGNOR TO THE HELD COMPANY, OF CHICAGO, ILLINOIS, A CORPORATION OF ILLINOIS.

WATER-FILTER.

1,082,024.  Specification of Letters Patent.  Patented Dec. 23, 1913.

Application filed April 18, 1913. Serial No. 762,020.

*To all whom it may concern:*

Be it known that I, SIEGFRIED HELD, a subject of the Emperor of Austria-Hungary, residing at Chicago, in the county of Cook and State of Illinois, have invented certain new and useful Improvements in Water-Filters, of which the following is a specification.

This invention relates to improvements in a water filtering device, and is intended for domestic or household use where the filtered water may be drawn directly from the filter, or, in cases where it is desired to filter the water and have the same stored in a receiving tank or vessel, from which the filtered water can be drawn, and it consists in certain peculiarities of the construction, novel arrangement and operation of the various parts thereof, as will be hereinafter more fully set forth and specifically claimed.

The principal object of the invention is to provide a water filter which shall be simple and inexpensive in construction, strong, durable and efficient in operation, and so made that the filtering material can be easily removed from the casing or receptacle therefor and without disconnecting the faucet through which the filtered water is drawn, or without disconnecting the conduit for the filtered water which leads from the filter to the receiving tank or casing.

Other objects and advantages will appear in the following description and explanation.

In the accompanying drawing, which serves to illustrate an embodiment of the invention,—Figure 1 is a central vertical sectional view of a water filter embodying the invention; Fig. 2 is a plan sectional view taken on line 2—2 of Fig. 1, and Fig. 3 is a view in side elevation of the upper portion of the filter, showing it equipped with a faucet and adapted for domestic or household use.

Like numerals of reference refer to corresponding parts throughout the different views of the drawings.

The casing or receptacle for the filtering material is designated by the reference numeral 5, and may be of any suitable size, form and material, but preferably of metal and cylindrical in shape as shown. This casing or receptacle has communication at its lower portion, and preferably in its bottom, through a pipe 6, with a supply of water, and has its upper end open. Near its upper end the casing 5, is provided with an inwardly extended annular flange 7, and above the same in its vertical wall with an outlet nozzle or projection 8, to which a pipe or portion of a faucet 9, may be connected by means of a coupling 10 of the ordinary or any well-known construction. The casing 5, is also provided near its upper end and at diametrically disposed points with bosses 11, each of which is provided with a screw-threaded socket to receive a screw bolt 12, which are used for pivotally connecting the ends of a yoke 13, to said bosses. This yoke is provided at its middle with a screw-threaded opening 14, for the reception and operation of an adjusting screw 15, which may have on its upper end a winged knob or handle 16, or other design, to be used for adjusting the same. The upper end of the casing 5, is closed by a head cap 17, which is provided centrally on its upper portion with a boss or projection 18, which has a socket 19, in its free end to receive the lower or free end of the screw 15, which is employed in conjunction with the yoke 13 to hold the head cap 17 securely in position on the open or free end of the casing.

As is clearly shown in Figs. 1 and 2 of the drawings, the cap 17 is provided at its upper part with a peripheral downturned flange 20, which, when the head is in position on the casing, overlies or overhangs the upper end of the latter. The head cap 17 is also provided with an annular or peripheral groove 21, which has communication through the tubular projection 8, with the pipe or faucet 9, and also has communication through a series of channels 22, with a central opening 23, extended from the bottom of the head cap 17, upwardly therein. Located in the upper portion of the groove 21, is a packing ring 24, of any suitable material, which will rest at its outer portion on the upper end of the casing 5, and thus hermetically seal the same.

Interposed between the flange 7, of the casing 5, and the bottom of the head cap 17, is a packing ring 25, of any suitable material, which will prevent the passage of water between the bottom of said cap and the flange 7 of the casing. Located within the casing 5, is a block 26 of any suitable porous filtering material such as tripolized stone, which may be of a shape to conform to the shape of the interior of the casing 5, and said block is provided with a central opening 27, which extends from end to end thereof, as shown. This block is connected to the head cap 17, by means of a rod 28, which is in screw-threaded engagement at its upper end with the cap 17, and has on its lower end a disk or plate 29, somewhat larger than the opening 27 in the block 26, of filtering material. Interposed between the disk or plate 29, and the lower end of the block 26, is a washer or packing ring 30, which will assist the disk 29 in closing the lower end of the opening 27, against the admission of water therein.

The operation of the device is as follows: The water to be filtered is supplied to the casing 5, through the supply pipe 6, from which it will enter said casing under pressure, and will rise therein and surround the block 26 of filtering material, which it will be observed is spaced from the walls of the casing 5, so as to permit water to surround it entirely from the flange 7 of the casing downwardly. As the block 26 is of porous material the water will percolate through the same and enter the opening 27, from which it will pass through the channels 22 into the groove 21, of the head cap, and from thence through the outlet opening 8, to the pipe 9, which, as before stated, may lead to a receiving tank or reservoir for filtered water, or, if desired, a faucet 9ª may be connected to the outlet opening 8 for the purpose of drawing the filtered water directly from the filter.

By means of the yoke 13, and adjusting screw 15, it is apparent that the head cap 17, may be firmly secured in place on the open or free end of the casing, and as said head cap rests on the packing rings 24 and 25, it is obvious that unfiltered water cannot pass into the groove 21, and also that leakage at the upper end of the casing will be prevented.

When it is desired to remove the filtering block 26, for the purpose of cleaning the same, the screw 15 can be disengaged from its socket in the boss or projection 18, when it is apparent the yoke 13 may be turned downwardly and to one side of the casing, thus permitting the head cap and block 26 to be removed without interference with the discharge pipes for the filtered water or the faucet for drawing the same.

Having thus fully described my invention, what I claim as new and desire to secure by Letters Patent, is—

1. In a water filter, the combination with a casing having an inlet and an outlet for water and one of its ends open and below said opening an inwardly projected annular flange, said outlet located between said flange and the open end of the casing, a single piece cap to close said open end of the casing and to rest on said flange and provided with a central cavity in its lower portion and a peripheral groove in communication with said cavity and outlet, said cap also having at the top of its groove a depending peripheral flange, packing interposed between the upper surface of said groove and the open end of the casing and between the lower surface of the cap and the annular flange of the casing, a hollow filtering block located on the lower surface of the cap with its cavity in communication with the cavity of the cap, a rod extended longitudinally through the filtering block and detachably engaging at one of its ends the said cap, a plate detachably secured on the opposite end of said rod and resting against the free end of the filtering block and closing the lower end of the cavity therein.

2. In a water filter, the combination with a casing having an inlet and an outlet for water and one of its ends open and below said opening an inwardly projected annular flange, said outlet located between said flange and the open end of the casing, a single piece cap to close said open end of the casing and to rest on said flange and provided with a central cavity in its lower portion and a peripheral groove in communication with said cavity and outlet, said cap also having at the top of its groove a depending peripheral flange, packing interposed between the upper surface of said groove and the open end of the casing and between the lower surface of the cap and the annular flange of the casing, a hollow filtering block located on the lower surface of the cap with its cavity in communication with the cavity of the cap, a rod extended longitudinally through the filtering block and detachably engaging at one of its ends the said cap, a plate detachably secured on the opposite end of said rod and resting against the free end of the filtering block and closing the lower end of the cavity therein, a yoke extended diametrically across the open portion of the casing and pivotally secured at its ends thereto, and an adjusting screw engaging the central portion of said yoke and adapted for engagement at one of its ends with the upper portion of the cap.

SIEGFRIED HELD.

Witnesses:
CHAS. C. TILLMAN,
J. R. OSMUN.

Copies of this patent may be obtained for five cents each, by addressing the "Commissioner of Patents, Washington, D. C."